(12) United States Patent
Long et al.

(10) Patent No.: US 9,324,111 B2
(45) Date of Patent: Apr. 26, 2016

(54) 271 EMBEDDED ALERTS

(71) Applicant: Passport Health Communications, Inc., Franklin, TN (US)

(72) Inventors: Amanda Barrett Long, Boca Raton, FL (US); Deepak Yedlarajaiah, Naperville, IL (US); Marcus Padgett, Villa Park, IL (US); Steven Kilsdonk, Nashville, TN (US); Richard W. Farmer, Nashville, TN (US)

(73) Assignee: Passport Health Communications, Inc., Franklin, TN (US)

( * ) Notice: Subject to any disclaimer, the term of this patent is extended or adjusted under 35 U.S.C. 154(b) by 0 days.

(21) Appl. No.: 14/099,804

(22) Filed: Dec. 6, 2013

(65) Prior Publication Data
US 2014/0164026 A1 Jun. 12, 2014

Related U.S. Application Data

(60) Provisional application No. 61/734,822, filed on Dec. 7, 2012.

(51) Int. Cl.
*G06Q 40/00* (2012.01)
*G06Q 40/08* (2012.01)

(52) U.S. Cl.
CPC ..................... *G06Q 40/08* (2013.01)

(58) Field of Classification Search
CPC ....... G06Q 10/00; G06Q 20/00; G06Q 40/00; G06Q 30/00
USPC ...................................... 705/3–44
See application file for complete search history.

(56) References Cited

U.S. PATENT DOCUMENTS

| | | | |
|---|---|---|---|
| 8,260,634 B1 * | 9/2012 | Lawlor | 705/2 |
| 8,321,284 B2 * | 11/2012 | Clements et al. | 705/20 |
| 8,326,656 B2 * | 12/2012 | Beery et al. | 705/4 |
| 8,447,627 B1 * | 5/2013 | Cruise | 705/2 |
| 8,781,850 B2 * | 7/2014 | Bazzani et al. | 705/2 |
| 2004/0078236 A1 | 4/2004 | Stoodley et al. | |
| 2005/0216250 A1 | 9/2005 | Simmon et al. | |
| 2006/0235881 A1 | 10/2006 | Masarie et al. | |

(Continued)

OTHER PUBLICATIONS

Pennsylvania Department of Health, Health Level Seven version 2.3.1, Dec. 1, 2005.

(Continued)

*Primary Examiner* — Frantzy Poinvil
(74) *Attorney, Agent, or Firm* — Merchant & Gould P.C.

(57) ABSTRACT

Normalizing codified data in an eligibility response and proactively identifying insurance eligibility and benefit documentation issues is provided. Data in an eligibility response may be mapped with other data including data received from healthcare providers, payers, data from inquiries, etc. The data may be stored in tables, and/or in internal and external databases. If there are any determined issues discovered, an alert of the issue found is embedded in the response or the determined issue may be automatically corrected. The alert may provide an instruction on how to rectify the issue to a healthcare provider administrative user. The formatting and structure of the eligibility response may be normalized such that message segments relating to a same service type are grouped together, providing a consistently formatted normalized response. Accordingly, an end user may be able to more easily find information in the normalized eligibility response.

20 Claims, 4 Drawing Sheets

(56) References Cited

U.S. PATENT DOCUMENTS

| | | |
|---|---|---|
| 2007/0005564 A1 | 1/2007 | Zehner |
| 2007/0050219 A1* | 3/2007 | Sohr et al. .......................... 705/4 |
| 2007/0124310 A1 | 5/2007 | Mathur |
| 2009/0094055 A1 | 4/2009 | Gage, Jr. et al. |
| 2010/0036676 A1 | 2/2010 | Safdi et al. |
| 2010/0121656 A1* | 5/2010 | Andros et al. .................... 705/3 |
| 2011/0251857 A1* | 10/2011 | Thorne et al. ..................... 705/3 |
| 2012/0191730 A1* | 7/2012 | Parikh et al. ................. 707/754 |
| 2012/0203853 A1* | 8/2012 | Davis et al. ................... 709/206 |
| 2013/0060576 A1 | 3/2013 | Hamm et al. |
| 2013/0204642 A1 | 8/2013 | Farmer et al. |

OTHER PUBLICATIONS

Office Action mailed Jul. 28, 2015, in U.S. Appl. No. 13/757,282.
Office Action mailed Dec. 29, 2014, in U.S. Appl. No. 13/757,282.
Office Action mailed Nov. 13, 2015, in U.S. Appl. No. 13/757,282.
Office Action mailed Feb. 10, 2016, in U.S. Appl. No. 13/757,282.

* cited by examiner

271 EMBEDDED ALERTS

CROSS-REFERENCE TO RELATED APPLICATIONS

The application claims priority to U.S. Provisional Patent Application No. 61/734,822 titled "271 Embedded Alerts" filed Dec. 7, 2012, the disclosure of which is hereby incorporated by reference in its entirety.

BACKGROUND

When a patient seeks healthcare services from a healthcare provider, the provider may request information from a payer (e.g., insurance company) to determine if the patient is eligible to receive benefits for healthcare services; and if the patient is eligible, other benefit and eligibility information such as benefit amounts, co-insurance, co-pays, deductibles, exclusions, and limitations related to a specific procedure may be provided. The request for information may be sent as an eligibility request, for example, a 270 request or transaction. A payer may communicate eligibility benefit information associated with a subscriber or dependent in a response, for example, a 271 response or reply.

The eligibility request and response may be required to meet transaction processing standards. For example, eligibility transactions may be sent in an X12 syntax format and may be coded and structured according to standards established by the Secretary of Health and Human Services (HHS) as required by the Health Insurance Portability and Accountability Act of 1996 (HIPAA). As is known in the art, HIPAA includes provisions for administrative simplification and support electronic exchange of administrative and financial healthcare transactions primarily between healthcare providers and plans. As should be appreciated, embodiments may be utilized with other formats, structures, and syntaxes according to changes in healthcare laws. For example, a 270 eligibility request may be replaced by an eligibility request of another format and utilizing an alternate syntax. A 271 response may be replaced by an eligibility response of another format and utilizing an alternate syntax.

When insurance eligibility and benefit information is communicated in a 271 response, the information may be improperly documented or may be inconsistent with patient information in a healthcare provider's information system. Currently, to overcome improper documentation and inconsistent information, users may use cheat sheets or other types of manual instructions written for individuals to look at data elements and compare it to documentations. As can be appreciated, this can be very time-consuming and prone to error. The ability for users to identify the information he/she needs in order to properly execute the registration process and to collect any up front co-pays, etc., may be challenging. It is with respect to this and other considerations the present invention has been made.

SUMMARY

Embodiments of the present invention provide for normalizing codified data in a received eligibility response and for proactively identifying insurance eligibility and benefit documentation issues. According to embodiments, data in an eligibility response may be mapped with other data including data received from healthcare providers, payers, data from inquiries, etc. The data may be stored in tables, and/or in internal and external databases. If there are any inconsistencies or determined issues, an alert of the issue found may be embedded in the response. The alert may provide an instruction on how to rectify the issue to a healthcare provider administrative user.

Additionally, the formatting and structure of the eligibility response may be normalized, providing a consistently formatted normalized response. Accordingly, an end user may be able to more easily find information in the normalized eligibility response.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
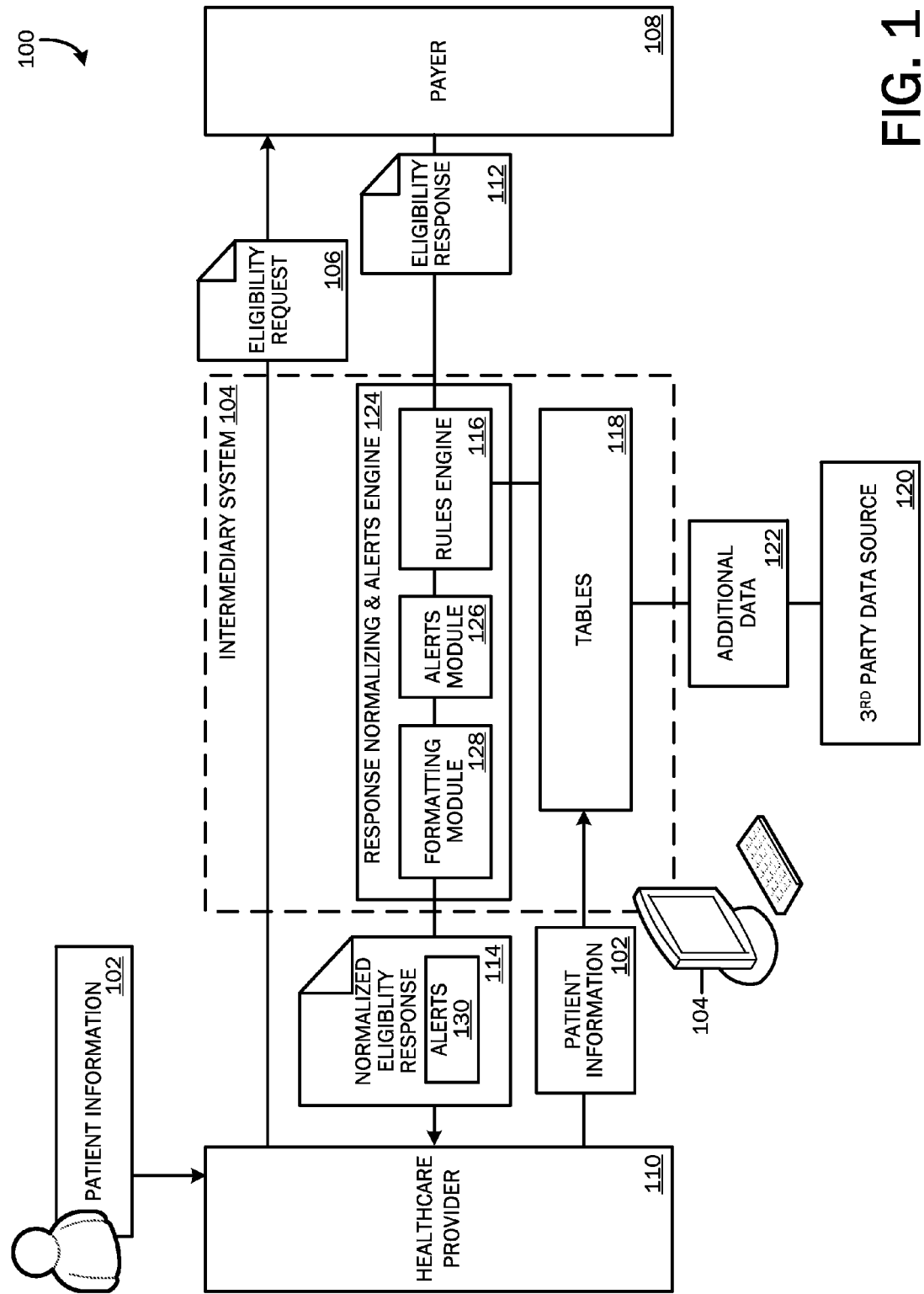
FIG. 1 is a simplified block diagram of a high-level system architecture with which embodiments of the invention may be implemented.

Embodiments of the present invention provide for normalizing codified data in an eligibility response and proactively identifying and providing alerts of discovered insurance eligibility and benefit documentation issues.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Referring now to FIG. 1, a simplified block diagram of a high-level system architecture 100 with which embodiments of the invention may be implemented is illustrated. Patient information 102 may be entered by the patient or by administrative personnel into a healthcare provider 110 information system. The patient information 102 may include demographic data such as, but not limited to, the user's name, address, phone number(s), social security number, date of birth, gender, marital status, emergency contact information, employment status and details, student status and details, insurance information, guarantor information, etc. The patient information 102 may also include such information as insurance information, medical history, etc.

The healthcare provider 110 may request information about healthcare coverage eligibility and benefits associated with a patient or dependent of a patient in the form of an eligibility, coverage, or benefit inquiry (herein referred to as an eligibility request 106). According to an embodiment, the eligibility request 106 may be a 270 request. The eligibility request 106 may be sent directly to a responder (referred to herein as a payer 108) or alternatively, may be sent to a payer 108 via an intermediary system 104. Because there are many different ways to communicate with various players in a healthcare system, an intermediary system 104 may be utilized to normalize communication solutions, data requirements, and transaction formats for their business partners.

As described above, an eligibility response 112 may be utilized to respond to an eligibility request 106 with coverage, eligibility, and benefit information. The eligibility response 112 may include such information as, but is not limited to, eligibility status, maximum benefits (policy limits), exclusions, in-plan vs. out-of-plan benefits, coordination of benefits (COB) information, deductible amounts, co-pay amounts, etc. The eligibility response 112 may be received by the sender, which may be the intermediary system 104 or the healthcare provider 110. According to embodiments, the system 100 may comprise a response normalizing and alerts engine 124. In the illustrated embodiment, the response normalizing and alerts engine 124 is executed on a computing device 104. An eligibility response 112 may be normalized and alerts may be added into a normalized eligibility response 114 by a rules engine 116, an alerts module 126, and a formatting module 128.

The rules engine 116, the alerts module 126, and the formatting module 128 of the response normalizing and alerts engine 124 may be operable to receive an eligibility response 112, parse data within the eligibility response 112, map and compare the data with patient information 102 and other additional data 122, if there are any inconsistencies or determined issues, insert an alert 130, and format the eligibility response 112 into a normalized eligibility response 114. The response normalizing and alerts engine 124 may be operable to normalize the formatting and structure of the eligibility response 112, and thus provide a consistently formatted response normalized response 114 to the healthcare provider 110. Accordingly, an end user may be able to more easily find information in the normalized eligibility response 114.

Although the response normalizing and alerts engine 124 is illustrated as located at the intermediary system 104, rules engine 116, the alerts module 126, and the formatting module 128 may be implemented within a healthcare provider system 110 or may be located remotely and accessed via a network. The rules engine 116, the alerts module 126, and the formatting module 128 may be implemented using one or more computing devices 104, and may be a combined into a single engine or may be two or more independent engines.

According to an embodiment, prior to normalizing an eligibility response 112, the response may first be codified. For example, data elements may be removed from an eligibility response, and may be replaced by coded strings in a reformatted eligibility response that can be effectively used by healthcare provider systems. Eligibility responses may be codified by a data restructuring engine. According to an embodiment, the data restructuring engine may be the data restructuring engine described in U.S. patent application Ser. No. 13/757,282 titled "Data Restructuring for Consistent Formatting" filed Feb. 1, 2013.

Consider for example, a patient goes to an emergency department at a hospital (healthcare provider 110) to receive healthcare services, and the patient has coverage with two insurance companies—a primary payer 108 and a secondary payer 108. Currently, without embodiments of the current invention, the healthcare provider 110 may send out eligibility requests 106 (or may use an intermediary system 104 to send the eligibility requests 106) to the primary and secondary payers 108. In return, the healthcare provider may receive a first and a second non-normalized eligibility response 112 respectively. The responses 112 may not be normalized in terms of content, and may comprise oftentimes large segments of free text in a disparate organization. Deductible amounts, co-payment amounts, co-insurance information, etc. may be found in different portions of the responses. Additionally, each payer 108 may use different terms in each response 112, let alone different terms being used by different payers. For example, in the first response 112 (from the primary payer 108), the in-network emergency department (ED) co-pay amount may be found on the second page, the out-of-network ED co-pay amount may be located on the sixth page, and primary care physician (PCP) information may be located on the ninth page.

According to embodiments, the formatting module 128 may be operable to parse the response 112 for message segments relating to a type of visit or type of service and reformat the response into a normalized eligibility response 114 such that the message segments relating to a same type of visit or service may be grouped together. With reference again to the above example, the eligibility response may be reformatted such that it includes an ED segment comprising the in-network co-pay amount and the out-of-network co-pay amount. The second response 112 (from the secondary payer 108) may be likewise reformatted.

Additionally, as described above, terminology used in eligibility responses 112 may vary. For example, one payer 108 may use the term "in-network facility co-pay," while another payer may use the term "emergency co-pay" to describe the same message segment. According to embodiments, the response normalizing and alerts engine 124 may be further operable to standardize terms used in responses and to include standard service codes where they can and should be used. Accordingly, when a healthcare provider 110 user receives the normalized eligibility response(s), he/she may receive a standardized predictable user-friendly format regardless of from which payer 108 he is receiving the response 114.

As described above, the system 100 may include one or more tables 118 which may be generated from patient data 102, data from an eligibility request 106, and additional data 122 from a payer 108, healthcare provider 110, another clearinghouse, data from an inquiry, etc. The rules engine 116 may utilize the table 118 to determine if the data in the eligibility response 112 matches data that would be expected according to the eligibility request 106 data, the patient data 102, and the additional data 122.

According to embodiments, alerts 130 may be embedded in the normalized eligibility response 114 when an inconsistency of information or other determined issue is discovered. An alert 130 may notify an end user, for example, an administrative worker at the healthcare provider 110, of an improper documentation of eligibility and benefits or of a potential problem that may result in a denied claim. The alert 130 may be a message embedded in the response 114, and may include a recommendation for an action to take to correct the discovered determined issue, which may be an inconsistency, discrepancy, or other problem related to received information. Patient information 102, data within the eligibility request 106, as well as additional data 122 may be utilized by the rules engine 116 to map with data in the eligibility response 112 received from the payer 108. The patient information 102 and the additional data 122 may be stored in tables 118 and/or in internal and/or external databases. The additional data 122 may comprise data from a payer 108, from a healthcare provider 110, from another clearinghouse, data from an inquiry, etc.

For example, a patient may visit a healthcare provider 110 and may provide the healthcare provider 110 with his insurance information. The patient may mistakenly tell the provider that he has a PPO plan, or the healthcare provider 110 administrative worker may mistakenly enter that the patient has a PPO plan. Upon comparing the data received in the eligibility response 112 from the payer 108 with the eligibility request 106 data, the patient data 102, and/or the additional data 122, a determination may be made that the patient has an HMO plan instead of a PPO plan. Accordingly, an alert 130 may be embedded into a normalized eligibility response 114 notifying the healthcare provider 110 that the data received in the eligibility response 112 from the payer 108 does not match the data provided by the healthcare provider 110.

According to an embodiment, when an inconsistency, discrepancy, or other problem in relation to an eligibility response 112 is discovered, an automatic action may be driven. For example, an incorrect data element may be automatically corrected. As described above, additional data 122 provided by a third party data source 120, from a healthcare provider 110, from a payer 108, or from an inquiry may be used to determine and correct inconsistencies or errors and to provide alerts.

According to an embodiment, primary care physician (PCP) information may be parsed from an eligibility response 112 and mapped with other data (e.g., patient information 102, information from the healthcare provider 110, information from the payer 108, additional data 122 from a third party data source 120 or from an inquiry, data stored in an internal or external database, etc.). For example, a patient may register as a patient at a certain hospital (healthcare provider 110). The hospital may send an eligibility request 106 (either directly or via an intermediary system 104) to the patient's payer 108. The response normalizing and alerts engine 124 may receive an eligibility response 112 from the payer 108 including the patient's PCP information (e.g., the PCP's name, location, effective date (with patient), phone number, etc.). The rules engine 116 may map the PCP information with other data, wherein a determination may be made that while the patient has coverage and the admitting physician is the patient's PCP, the patient does not have coverage at the specific hospital (healthcare provider 110). Accordingly, an alert 130 may be provided in a normalized eligibility response 114 to notify the healthcare provider 110 that the payer 108 will not pay for healthcare services provided to the patient at the given facility by the particular physician. The alert 130 may also include information notifying the healthcare provider 110 of facilities where the patient may be seen where he will be covered by his health insurance plan.

As another example, received patient information 102 may indicate that a patient does not have insurance. A determination may be made that the patient does have insurance via coverage discovery processes and accordingly, an alert 130 may be sent to the healthcare provider 110 to notify them of the discrepancy. The alert 130 may be embedded in a normalized eligibility response 114, and may include a recommendation for the healthcare provider 110 to correct the patient information 102 in the information system with the discovered insurance information.

Figure 2A:
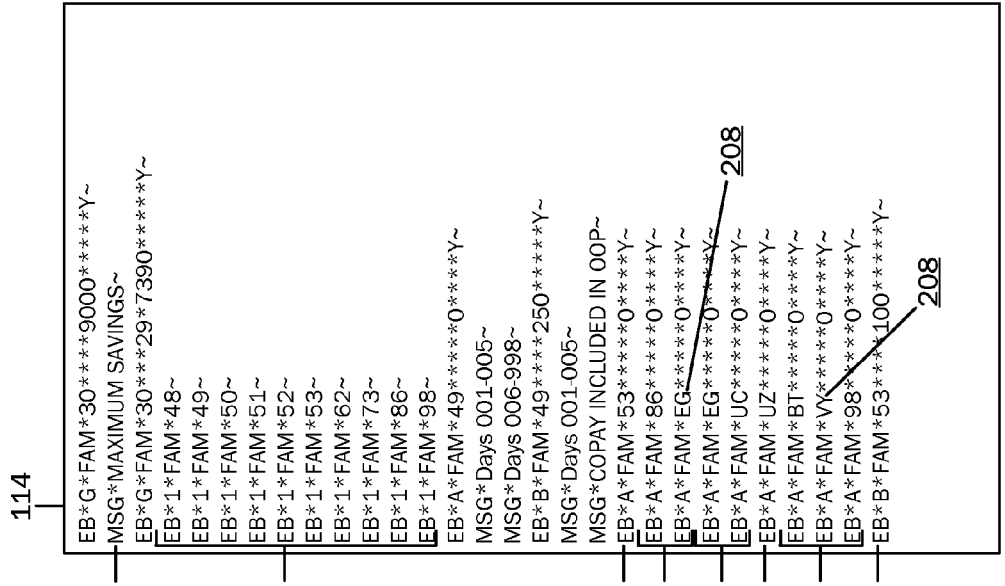
FIG. 2A is an example illustration of an eligibility response prior to normalization.
Figure 2B:
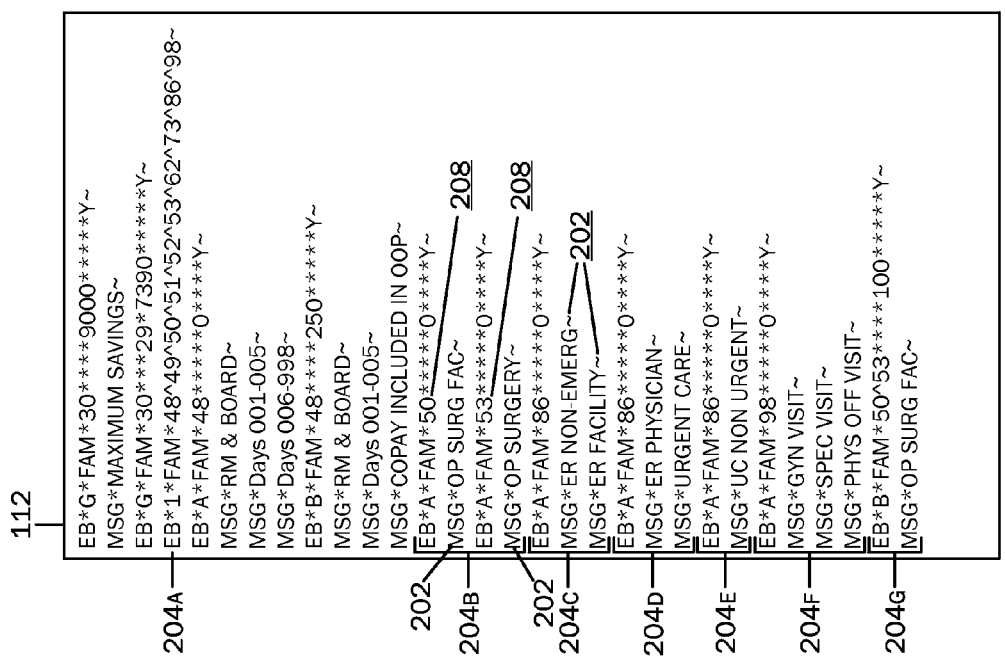
FIG. 2B is an example illustration of a normalized eligibility response.

Referring now to FIGS. 2A and 2B, an example of a portion of an eligibility response 112 prior to normalizing (FIG. 2A) and an example of a portion of the normalized eligibility response 114 (FIG. 2B) is illustrated. As can be seen by comparing the eligibility response 112 and the normalized eligibility response 114, after normalizing the response, the number of message segments 202 may be reduced, and service codes 208 may be utilized where possible. As a first example, the eligibility response 112 in FIG. 2A comprises an eligibility benefit (EB) segment 204A detailing a series of service codes representative of services for which a patient is eligible to receive benefits. The codes may represent services such as Hospital-Inpatient, Hospital-Room and Board, Hospital-Outpatient, Hospital-Emergency Accident, Hospital-Emergency Medical, Hospital-Ambulatory Surgical, etc. After normalization, the EB segment may be broken into multiple normalized EB segments 206A as illustrated in the normalized eligibility response 114 in FIG. 2B. By breaking the EB segment 204A into multiple segments, an administrative user may be able to more easily see the codes for which he/she may be searching.

Components 204B and 206B are another example of a component before and after normalizing respectively. Component 204B in the eligibility response 112 includes redundant information. For example, the service code "50" 208 in the first line indicates "outpatient," and the service code "53" 208 in the third line indicates "outpatient surgery." After normalizing, the four lines may be reduced to a single EB segment line 206B as illustrated in FIG. 2B.

As described above, message segments 202 may be replaced by service codes 208 in a normalized eligibility response 114 where possible. That is, non-standard terminology may be normalized and replaced by standard codes 208. For example, prior to normalizing, component 204C in the eligibility response 112 includes a plurality of message segments 202. After normalizing and as illustrated in FIG. 2B, the message segments 202 may be replaced by an EB segment 206C comprising service codes 208 indicating the same information. Other examples of redundant information and message segments 202 being replaced by EB segments 206D comprising standard service codes 208 include components 204D, 204E, 204F, and 204G being replaced by components 206D, 206E, 206F, and 206G.

Figure 3:
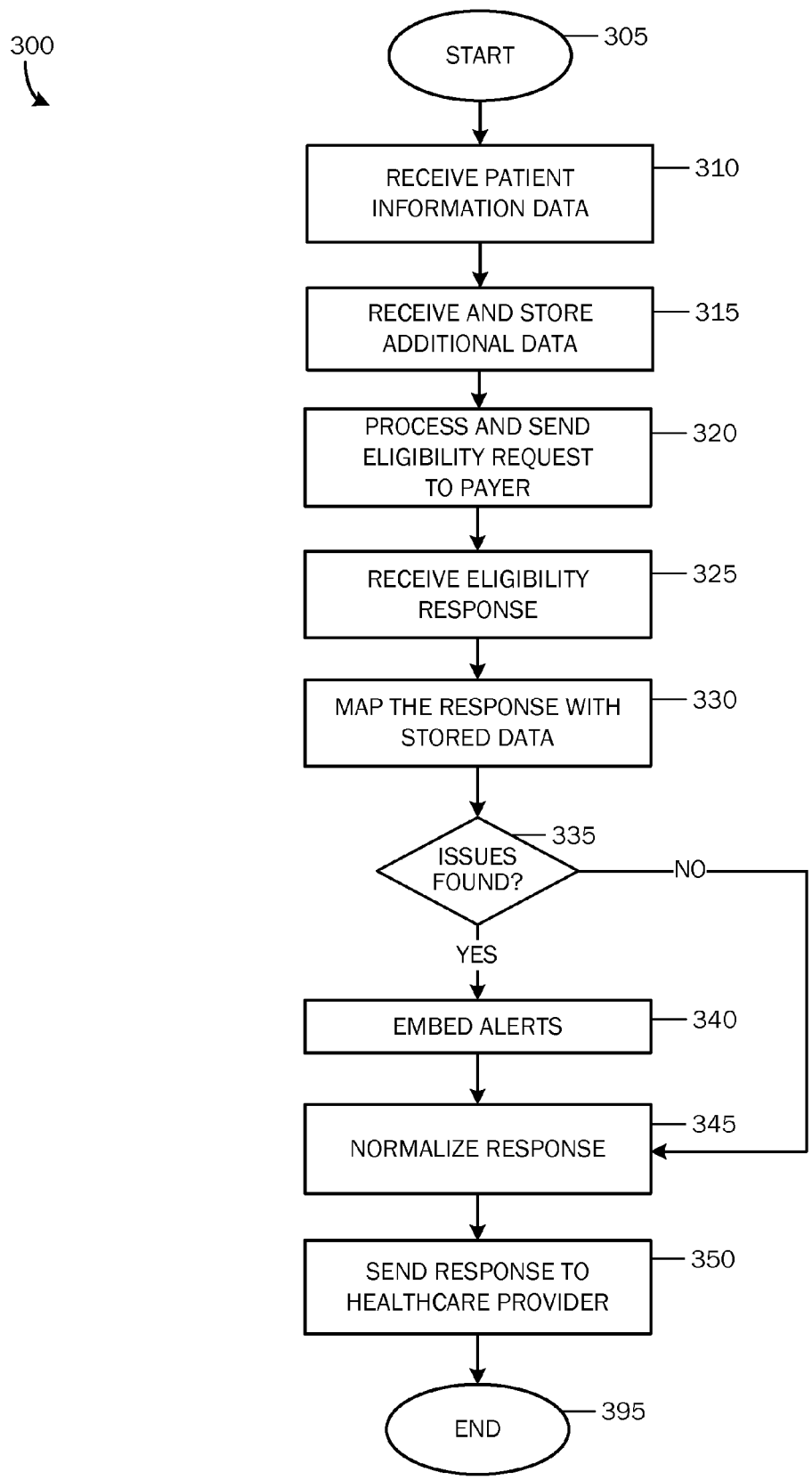
FIG. 3 is a flow chart illustrating a method for proactively identifying insurance eligibility and benefit documentation issues.

Referring now to FIG. 3, a process flow diagram illustrating a method 300 for normalizing an eligibility response 112 and for providing alerts 130 for insurance eligibility and benefit documentation issues is illustrated. The method 300 starts at OPERATION 305 and proceeds to OPERATION 310 where patient information 102 is received. As described above, patient information 102 may include demographic data and other data utilized to create a 270 eligibility inquiry 106. Patient information 102 may be included in an eligibility inquiry 106 sent by a healthcare provider 110.

At OPERATION 315, additional data 122 may be received. For example, additional data 122 may include data provided by a healthcare provider 110, by a payer (insurance company) 108, data from an inquiry, and/or data provided by one or more third party data sources 120. Patient information 102 and additional data 122 may be stored in internal and/or external databases, and may be stored in one or more tables 118 as described above.

The method 300 proceeds to OPERATION 320, where an eligibility request 106 is created and sent to a payer 108. According to one embodiment, an intelligent eligibility request may be sent to the payer. The intelligent eligibility request may be an eligibility request created by an intelligent request engine as described in U.S. patent application Ser. No. 14/046,851 filed on Oct. 4, 2013.

At OPERATION 325, an eligibility response 112 is received. As described above, the eligibility response 112 may include eligibility status, maximum benefits (policy limits), exclusions, in-plan vs. out-of-plan benefits, coordination of benefits (COB) information, deductible amounts, co-pay amounts, primary care physician information, etc.

The method 300 proceeds to OPERATION 330, where data in the eligibility response 112 is mapped with stored data (e.g., patient information 102 and additional data 122). At DECISION OPERATION 335, a determination may be made whether any information is inconsistent, incorrect, or if a potential problem that may result in a claim denial is discovered.

If an issue is found, the method 300 may proceed to OPERATION 340, where an alert 130 may be created and embedded in the response. The alert 130 may be a text message inserted into a generic field of the response, and may provide a recommendation to fix the discovered problem. According to an embodiment, the problem may be automatically corrected.

If an issue is not found or after alerts 130 are embedded, the method 300 may proceed to OPERATION 345, where the response may be normalized. As described above, message segments within the eligibility response 112 may be grouped by service types and standardized into a normalized format.

The method 300 may proceed to OPERATION 350 where the normalized eligibility response 114 is sent to the healthcare provider 110. The method 300 ends at OPERATION 395.

Embodiments of the invention may be implemented via local and remote computing and data storage systems. Such memory storage and processing units may be implemented in a computing device, such as computing device 400 of FIG. 4. Any suitable combination of hardware, software, or firmware may be used to implement the memory storage and processing unit. For example, the memory storage and processing unit may be implemented with computing device 400 or any other computing devices 418, in combination with computing device 400, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with embodiments of the invention.

Figure 4:
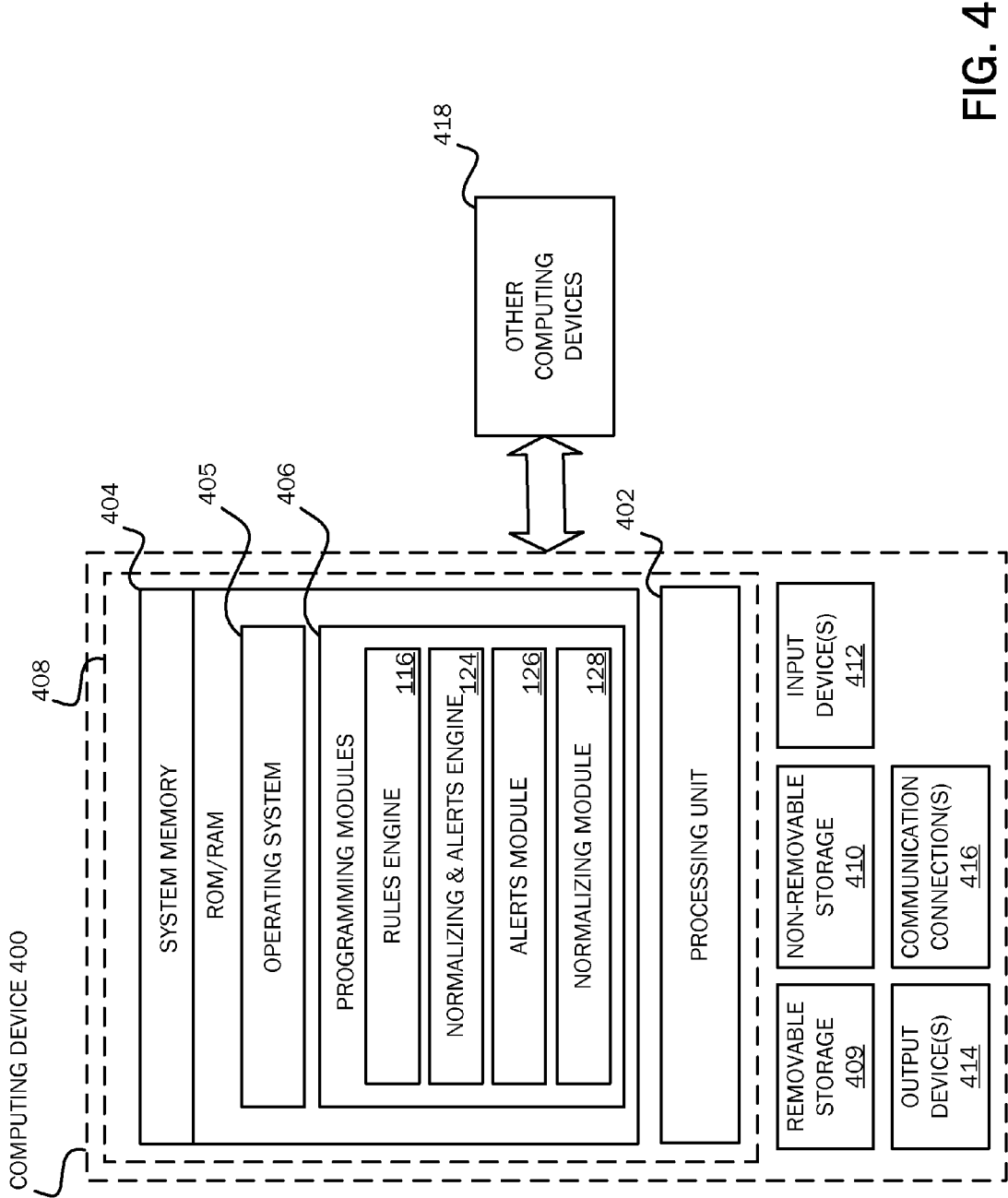
FIG. 4 is a simplified block diagram of a computing device with which embodiments of the present invention may be practiced.

With reference to FIG. 4, a system consistent with embodiments of the invention may include one or more computing devices, such as computing device 400. The computing device 400 may include at least one processing unit 402 and a system memory 404. The system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a normalizing and alerts engine 124, which may comprise a rules engine 116, an alerts module 126, and a normalizing module 128 wherein the normalizing and alerts engine 124, rules engine 116, alerts module 126, and normalizing module 128 are software applications having sufficient computer-executable instructions, which when executed, perform functionalities as described herein. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408. Computing device 400 may also include one or more input device(s) 412 (keyboard, mouse, pen, touch input device, etc.) and one or more output device(s) 414 (e.g., display, speakers, a printer, etc.).

Although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data and/or computer-executable instructions readable by a computing device. Computer-readable storage medium do not include communications media.

Further, the disclosed methods' stages may be modified in any manner, including by reordering stages and/or inserting or deleting stages, without departing from the invention.

The computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

Program modules, such as the normalizing and alerts engine 124, rules engine 116, alerts module 126, and normalizing module 128, may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system.

Embodiments of the present invention, for example, are described above with reference to block diagrams and/or operational illustrations of methods, systems, and computer program products according to embodiments of the invention. For example, FIGS. 1-4 and the described functions taking place with respect to each illustration may be considered steps in a process routine performed by one or more local or distributed computing systems. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

All rights including copyrights in the code included herein are vested in and the property of the Applicant. The Applicant retains and reserves all rights in the code included herein, and grants permission to reproduce the material only in connection with reproduction of the granted patent and for no other purpose.

We claim:

1. A method comprising:
    receiving via at least one computer hardware component, over a computer network, eligibility data in an eligibility response that includes a number of message segments, wherein each message segment includes one or more data elements;
    using the at least one computer hardware component with a rules engine to determine if the eligibility data is inconsistent, incorrect, or includes a potential problem;
    using the at least one computer hardware component with an alerts module to embed an alert in the eligibility response, wherein the alert embedded in the eligibility response includes information on how to rectify an issue associated with the alert; and
    using the at least one computer hardware component with a formatting module to remove the data elements from the message segments of the eligibility response and replace the data elements with coded strings that include service codes.

2. The method of claim 1, further comprising using the at least one computer hardware component with the formatting module to group message segments of the eligibility response that relate to a same healthcare service type.

3. The method of claim 1, further comprising using the at least one computer hardware component with the formatting module to:
    break a string of service codes in an eligibility benefits segment into multiple eligibility benefits segments; and
    replace non-standard terminology with a standard service code.

4. The method of claim 1, further comprising using the at least one computer hardware component to receive data over the computer network from one or more of:
    a healthcare provider;
    a payer;
    an inquiry; or
    a clearinghouse.

5. The method of claim 1, further comprising using the at least one computer hardware component with the alerts module to embed the alert in the eligibility response by inserting a message segment into the eligibility response.

6. The method of claim 1, wherein the alert comprises a notification of a determined issue found and an in instruction on how to correct the determined issue.

7. The method of claim 1, further comprising automatically correcting a discovered issue that will result in a claim denial.

8. A system comprising:
    one or more computer processors coupled to a computer network; and
    a memory, a rules engine, an alerts module, and a formatting module coupled to the one or more computer processors, the one or more computer processors operable to:
    receive eligibility data in an eligibility response that includes a number of message segments, wherein each message segment includes one or more data elements over the computer network;
    use the rules engine to determine if the eligibility data is inconsistent, incorrect, or includes a potential problem;
    use the alerts module to embed an alert in the eligibility response, wherein the alert embedded in the eligibility response includes information on how to rectify an issue associated with the alert; and
    use the formatting module to remove the data elements from the message segments of the eligibility response and replace the data elements with coded strings that include service codes.

9. The system of claim 8, wherein the one or more computer processors are operable to use the formatting module to group together message segments of the eligibility response that relate to a same healthcare service type.

10. The system of claim 8, the one or more computer processors are operable to use the formatting module to:
    break a string of service codes in an eligibility benefits segment into multiple eligibility benefits segments; and
    replace non-standard terminology with a standard service code.

11. The system of claim 8, wherein the one or more computer processors are operable to receive data from one or more of:
    a healthcare provider;
    a payer;
    an inquiry; or
    a clearinghouse.

12. The system of claim 8, wherein the one or more computer processors are operable to use the alerts module to insert the alert into a message segment of the eligibility response, the alert comprising a notification of an inconsistency, an error, or the potential problem and an instruction on how to correct the inconsistency, the error, or the potential problem.

13. The system of claim 8, wherein the one or more computer processors are further operable to automatically correct a discovered inconsistency, an error, or the potential problem that may result in a claim denial.

14. A computer readable medium containing computer executable instructions which, when executed by a computer, perform a method comprising:

receiving via at least one computer hardware component, over a computer network, eligibility data in an eligibility response that includes a number of message segments, wherein each message segment includes one or more data elements;

using the at least one computer hardware component with a rules engine to determine if the eligibility data is inconsistent, incorrect, or includes a potential problem;

using the at least one computer hardware component with an alerts module to embed an alert in the eligibility response, wherein the alert embedded in the eligibility response includes information on how to rectify an issue associated with the alert; and using the at least one computer hardware component with a formatting module to remove the data elements from the message segments of the eligibility response and replace the data elements with coded strings that include service codes.

15. The computer readable medium of claim 14, further comprising using the at least one computer hardware component with the formatting module to group message segments of the eligibility response that relate to a same healthcare service type.

16. The computer readable medium of claim 14, further comprising using the at least one computer hardware component with the formatting module to:

break a string of service codes in an eligibility benefits segment into multiple eligibility benefits segments; and replace non-standard terminology with a standard service code.

17. The computer readable medium of claim 14, further comprising using the at least one computer hardware component to receive data over the computer network from one or more of:

a healthcare provider;

a payer;

an inquiry; or a clearinghouse.

18. The computer readable medium of claim 14, further comprising using the at least one computer hardware component with the alerts module to embed the alert in the eligibility response by inserting a message segment into the eligibility response.

19. The computer readable medium of claim 14, wherein the alert comprises a notification of a determined issue found and an in instruction on how to correct the determined issue.

20. The computer readable medium of claim 14, further comprising automatically correcting a discovered issue that will result in a claim denial.

\* \* \* \* \*